United States Patent
Casaccia et al.

(10) Patent No.: US 8,063,990 B2
(45) Date of Patent: Nov. 22, 2011

(54) TELEVISION PRODUCTION TECHNIQUE

(75) Inventors: Edward Marion Casaccia, Carmichael, CA (US); David Alan Casper, Nevada City, CA (US); Paul Martell Trethewey, Nevada City, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1164 days.

(21) Appl. No.: 10/586,554

(22) PCT Filed: Jan. 20, 2005

(86) PCT No.: PCT/US2005/002425
§ 371 (c)(1),
(2), (4) Date: Jul. 19, 2006

(87) PCT Pub. No.: WO2005/071686
PCT Pub. Date: Aug. 4, 2005

(65) Prior Publication Data
US 2008/0231758 A1    Sep. 25, 2008

Related U.S. Application Data

(60) Provisional application No. 60/537,875, filed on Jan. 20, 2004.

(51) Int. Cl.
*H04N 5/262* (2006.01)
(52) U.S. Cl. .......................... 348/584; 348/722
(58) Field of Classification Search ............ 386/52, 386/53, 83, 278, 280, 281, 290; 348/578, 348/705, 722, 584
See application file for complete search history.

(56) References Cited

U.S. PATENT DOCUMENTS

| | | | | |
|---|---|---|---|---|
| 3,758,712 | A * | 9/1973 | Hudson | 348/594 |
| 5,115,310 | A | 5/1992 | Takano et al. | |
| 5,262,865 | A * | 11/1993 | Herz | 348/705 |
| 5,307,456 | A | 4/1994 | MacKay | |
| 5,864,366 | A | 1/1999 | Yeo | |
| 6,452,612 | B1 * | 9/2002 | Holtz et al. | 715/723 |
| 6,463,205 | B1 | 10/2002 | Aschbrenner et al. | |
| 6,686,970 | B1 | 2/2004 | Windle | |
| 6,714,723 | B2 | 3/2004 | Abecassis | |

(Continued)

FOREIGN PATENT DOCUMENTS

DE    1962595    1/1998

(Continued)

OTHER PUBLICATIONS

Robert R. Turner, "1,001 Ouestions to Ask Before Deciding on a Nonlinear Video Editing Systern", SMPTE Journal, Mar. 2004, pp. 160-173, XP000445583.

(Continued)

*Primary Examiner* — David Harvey
(74) *Attorney, Agent, or Firm* — Robert D. Shedd; Robert B. Levy (57) ABSTRACT

A television production system affords simplification over the automation of a television program such as a news program by making use of State Memory Objects (S-MEMs), each defining one or more operations for execution by one or more production devices. The S-MEMS serve to control one or more actuators on a control panel so that each actuator on the control panel can control different function of different pieces of production equipment depending on the S-MEM selected, and the actuator manifests a status of the production device.

10 Claims, 7 Drawing Sheets

U.S. PATENT DOCUMENTS

| | | | |
|---|---|---|---|
| 6,747,706 B1 | 6/2004 | Geddes et al. | |
| 6,760,916 B2 | 7/2004 | Holtz et al. | |
| 6,768,519 B2 * | 7/2004 | Fujita et al. | 348/705 |
| 6,792,469 B1 | 9/2004 | Callahan et al. | |
| 7,020,381 B1 * | 3/2006 | Kato et al. | 386/280 |
| 7,024,677 B1 * | 4/2006 | Snyder et al. | 725/86 |
| 2001/0024240 A1 | 9/2001 | Fujita et al. | |
| 2002/0175931 A1 | 11/2002 | Holtz et al. | |
| 2003/0214605 A1 | 11/2003 | Snyder et al. | |
| 2003/0218696 A1 | 11/2003 | Bagga et al. | |
| 2004/0036632 A1 * | 2/2004 | Ford | 341/22 |

FOREIGN PATENT DOCUMENTS

| | | | |
|---|---|---|---|
| EP | 0579354 | | 1/1994 |
| EP | 579354 | * | 1/1994 |
| EP | 817474 | * | 1/1998 |
| EP | 0 915 469 A2 | | 5/1999 |
| JP | 1-265674 | | 10/1989 |
| JP | 10-065936 | | 3/1998 |
| WO | WO 99/05821 | | 2/1999 |
| WO | WO 03/014949 A1 | | 2/2003 |

OTHER PUBLICATIONS

Thomas Nowara, "Halbzeit in Der Digitalen Nonlinearen Nachbearbeitung", Praxisnache Betrachtungen and Systemuberblick, pp. 715-734.

Bruce Rayner, "High-Level Switcher Interlace Improves Editing Techniques", S.M.P.T.E. Journal, Aug. 1985, XP002026373.

European Search Report Dated May 13, 2005.

"Half-Time in Digital Nonlinear Postproduction", Considerations and system overvire based on practical experiences. Published in Femseh-und Kino-technik 8195 FKT,49(1995)Dec., o.12, Heidelberg, DE pp. 1-61.

* cited by examiner

TELEVISION PRODUCTION TECHNIQUE

CROSS REFERENCE TO RELATED APPLICATION

This application claims the benefit, under 35 U.S.C. §365 of International Application PCT/US2005/002425, filed Jan. 20, 2005, which was published in accordance with PCT Article 21(2) on Aug. 4, 2005 in English and which claims the benefit of U.S. provisional patent application No. 60/537,875, filed Jan. 20, 2004.

TECHNICAL FIELD

This invention relates to a system for pre-programming of television productions, and to a method of that simplifies such preprogramming and enhances operator control of the exact timing of the production.

BACKGROUND ART

The production of a television program comprises complex undertaking. Traditional methods require the cooperation and coordination of talent and technical staff, using a wide range of audio and video equipment. This is particularly apparent in the production of a television news program. Such programs are generally produced "live" and embody multiple pre-recorded elements, one or more live presenters, and complex production effects that contribute to the flow and interest level of the program. Many television organizations produce news broadcasts, and such organizations strongly compete to attract and retain the maximum number of viewers. Most viewers want fast-paced news programs that make use sophisticated production techniques for audio and video including, for example, complex visual effects. Such complexity requires a large number of equipment operators, thus increasing the likelihood of mistakes during production. For these reasons, there have been a large number of attempts to automate the process to some degree, and to provide improved user interfaces that simplify the tasks of the operators. U.S. Pat. No. 5,115,310 (Takano et al) and U.S. Pat. No. 5,892,507 (Moorby et al) represent past attempts to add the elements of automation and improved user interface to the television production process.

U.S. Pat. No. 6,452,612 (Holtz et al) best exemplifies the state of the prior art of automated television production systems. Holtz et al describe a system that allows pre-programming of most of the complex actions required for a television program, and particularly, a news program, thus minimizing the work required by operators during production. The Holtz et al system makes use of a time line. Each event, defined as a change in the status of, or any new command to, any piece of production equipment, receives an allocated slot on the timeline. Upon actuation of a timer, a processor executes each event at its designated time on the time line, thus allowing completion of the event within the allocated time. The Holtz et al. patent, characterizes events as "transition macros" and each such transition macro can include a number of individual timed production activities such as an audio fade or a video wipe, for example.

Executing such transition macros automatically without interruption can present certain difficulties for a production that includes live talent. A person reading a script typically will do so at slightly different speeds at different times. For that reason, the time required for reading of a particular item "on air" will likely differ to some degree from the time recorded during rehearsals. Unpredictable events, such as a cough or stumbling over a word, add to the uncertainty of the actual event time during live production. With experienced talent, the differences, while small, remain sufficiently significant to make a simple automatic timeline-driven system unsatisfactory. Television viewers have a high sensitivity to imperfections such as clipped words or inappropriate pauses. Any program that exhibits such problems likely would not retain its audience over a long period of time. A high-quality production requires manual triggering of events in response to the actual timing as determined by live performers and other factors. In their patent, Holtz et al address this problem by introducing "step marks" or "pause events." for insertion in the timeline. A pause event effectively defeats the automatic triggering of a subsequent event, by interrupting execution of the timer.

Within the Holtz et al. system, stored events refer only to a single controlled device. If a new program segment requires, for example, a video switcher selection, fade-up of a different microphone, and zoom of a camera lens, programming of these events must occur separately to accomplish a transition to the new segment. Other program transitions can have much more complexity than this simple example and will require creation of a larger number of events.

Programming of complex transition typically involves many separate events. Given that a typical television production system usually includes a large number of separate devices, arranging all of events needed to accomplish a transition to achieve a particular scene for transmission often proves problematical. Selecting among the many individual operations of each of the various pieces of production equipment takes significant time, making programming an arduous task.

In practice, the change from one program segment to the next will typically require simultaneous or closely coordinated changes in many of the controlled devices. Advantageously, the system of Holtz et al provides one or more Graphical User Interfaces (GUIs) for controlling one or more devices, obviating the need to provide large and complex control panels that are normally used to control devices such as video switchers, audio mixers, and digital effects devices. However, this approach also incurs limitations. GUIs do not always constitute the preferred user interface for adjusting critical controls. Many operations, particularly on video equipment, require that the operator view the result of control adjustment on a video screen, while adjusting the control, but operation of the GUI frequently requires that the operator look at the GUI rather than the video image. There are many other circumstances where the "feel" of a physical control is preferred to use of a GUI.

Within the Holtz et al system, all dynamic transitions, such as video wipes, audio fades, etc., require pre-programming under the control of the program timer. However, to achieve a high quality television production, sometimes, the operator will need to change the speed of such a transition, or slightly offset the video and audio transitions. Such a refinement can occur only if the operator has access to the physical controls of the various pieces of production equipment during production. However, as discussed above, the physical control panels normally supplied with such equipments are large and complex, and it is not generally practical for a single person to be responsible for operation of an array of such control panels. The drawbacks associated with present day production equipment, as discussed above, typically preclude a single operator from handling all of the controls of an array of control panels needed to effect the desired offset.

International Patent Publication WO 99/0581 describes a machine control system for controlling various pieces of equipment for producing a television news broadcast. The system includes a director work station connects to a server linked to one or more external production devices. A director uses the work station by selecting one or more events, causing the server to communicate information to the production devices to execute such events. A graphical user interface provides a display of the status of the various production devices. The machine control system of WO 99/0581, like that of the system of Holtz et al. also suffers from the disadvantage of precluding a single operator from handling all of the controls of an array of control panels needed to effect the desired offset.

Thus, a need exists for a television production technique that overcomes the aforementioned disadvantages.

SUMMARY OF THE INVENTION

In accordance with a preferred embodiment of the present principles, there is provided a method of controlling at least one production device for producing a television show. The method commences by first establishing a plurality of states of the at least one production device, each state corresponding to at least one operation executable by the device. The states of the states of the at least one production device are stored as corresponding memory objects which upon execution cause the one production, device to execute the at least one operation, which results in generation of a scene. Responsive to selection of each memory object, at least one actuator is actuated to control an operation of the at least one production device in accordance with the at least one operation associated with that state memory object.

DETAILED DESCRIPTION

In accordance with the present principles, a television production system affords simplification over the automation of a television program such as a news program by parameterizing State Memory Objects (S-MEMs), each defining one or more operations for execution by one or more production devices. The S-MEMs are typically parameterized in accordance with the scenes they generate. In this way, the S-MEMs can be categorized by style, that is to say, by the "look" or appearance of the associated scene. In this way, a director can more easily select among available S-MEMs to choose those that maintain a particular appearance for a succession of scenes. While the description of the various embodiments in accordance with the present principles and applicable background art will focus on live television news production, those practiced in the art will recognize the principles equally apply to other complex television productions, whether live or recorded for future transmission.

Figure 1:
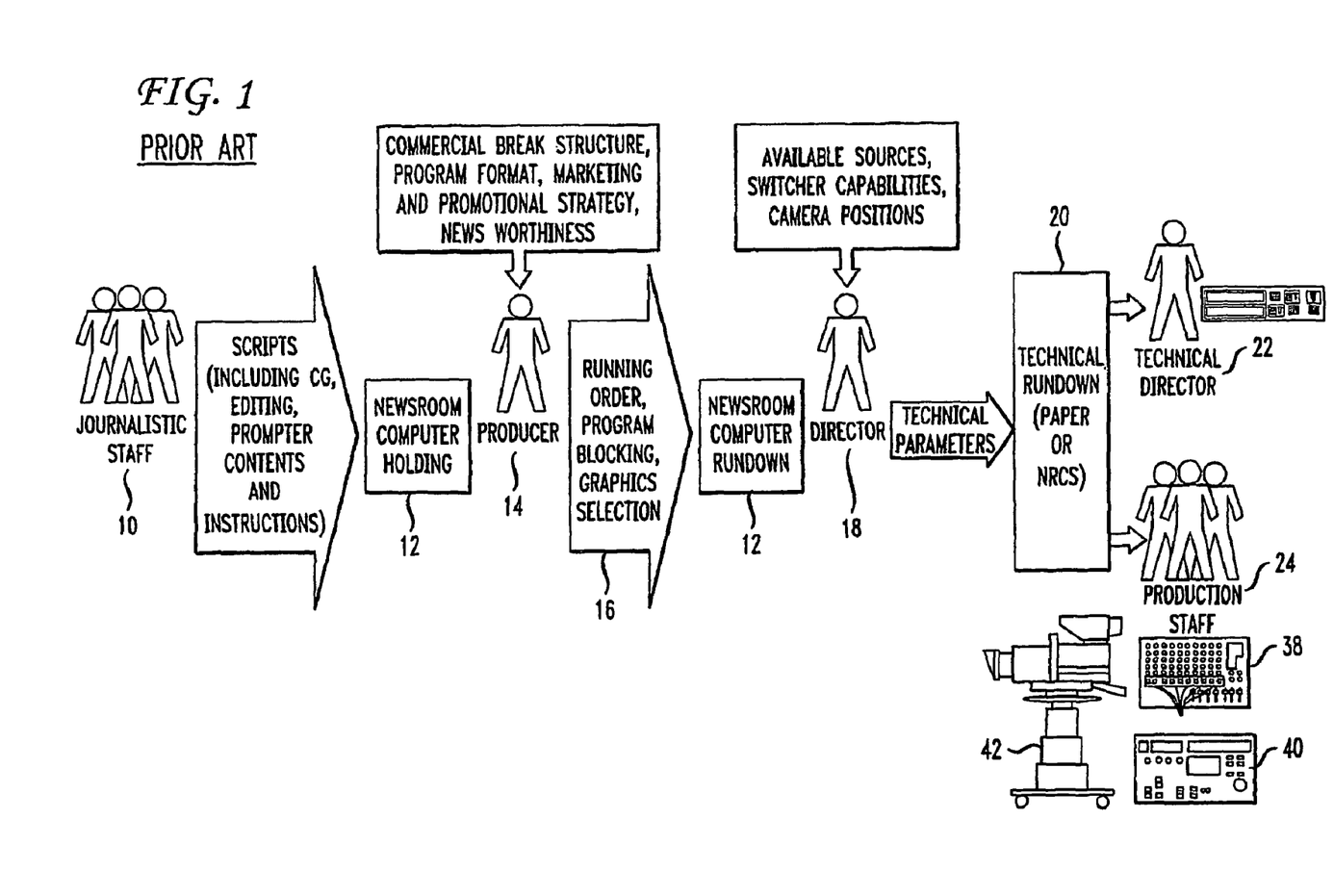
FIG. 1 depicts a work flow arrangement according to the prior art for producing a television program.

To understand the television production technique of the present principles, a brief discussion of present day production techniques will prove helpful. FIG. 1 illustrates the general workflow arrangement associated with creating a television program, such as a television news program, according to the prior art. News reporters 10 prepare news items; some of which can take the form of complete program segments that include edited video and associated audio. Other news items will contain only partially complete stories, in the form of edited video, with a script for reading by live talent upon transmission of the video. Still other items might comprise only a script, perhaps with specifications for graphics that should be prepared for use with the script. A Newsroom Computer System (NRCS) 12, such as the News Edit System, available from Thomson Broadcast and Media Solutions, Nevada City, Calif., registers the assets associated with each of these items. A news producer 14, responsible for producing the news program, makes content decisions. The producer 14 will review all submitted news items for "news worthiness" and, in conjunction with known rules for program format, commercial break structure, etc., will decide which items to include, and will generate a "running order" 16. The running order 16 specifies the order of the items, as well as their duration. The producer 14 enters the running order into the NRCS 12, for further refinement by a Director 18. The Director 18 uses the running order in conjunction with knowledge of the technical facilities available for the program to create a Technical Rundown 20. Traditionally the Technical Rundown constituted a printed document for use by all of the staff creating the program, including a Technical Director 22 who, along with other production staff 24, control an audio mixer 38, a video switcher 40, and one or more cameras, possibly with robotic lenses and dollies 42.

Figure 2:
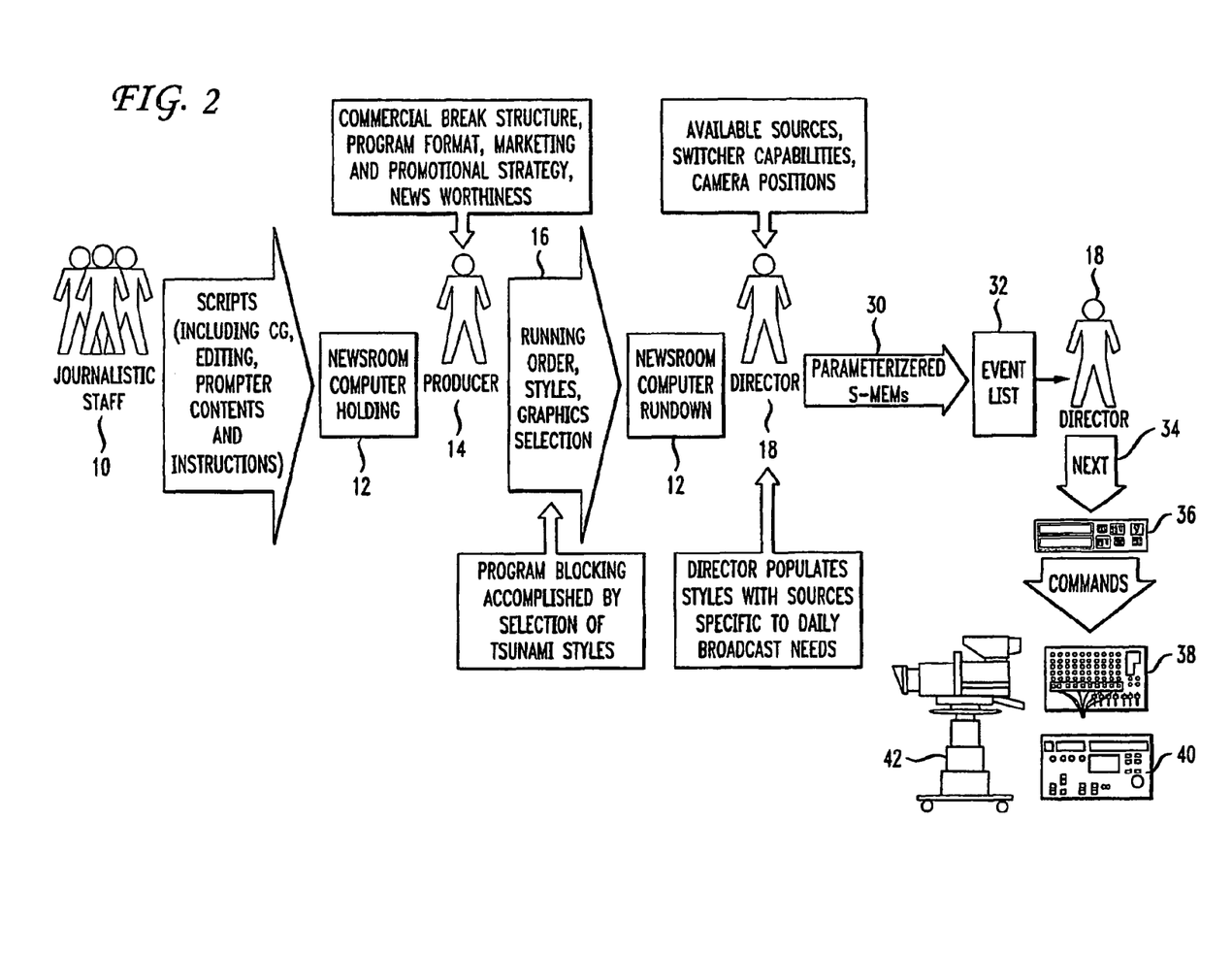
FIG. 2 depicts a workflow arrangement according to the present principles for producing a television program.

FIG. 2 shows a revised workflow of a television production process in accordance with the present principles. The workflow of FIG. 2 bears many similarities in common with the workflow of FIG. 1 and like reference numbers refer to like elements. Like the workflow of FIG. 1, the workflow associated with the television production process of the present principles illustrated in FIG. 2 has the same sequence of operation up to generation of the running order 16. At this point, the Director 18 can pre-produce the show. The Director 18 uses the running order 16, taking into account the available production equipment such as that shown including audio mixer 38, video switcher 40, and one or more cameras, possibly with robotic lenses and dollies 42. The Director 18 will create successive segments of the show in accordance with the rundown. However, instead of having live operators manipulate the various control panels normally associated with such equipment, a Presentation System 36 performs setup of the equipment. The Presentation System 36 can include one or more Graphical User Interfaces, and can optionally include one or more context sensitive control panels (described in greater detail with respect to FIGS. 4-7) that can operate some or all of the different pieces of production equipment, or subsets of the controls thereof, as required.

As each segment is finalized, the Director 18 establishes a State Memory Object (S-MEM) 30 that embodies all of the operations necessary for execution by the various pieces of production equipment to create that program segment, which manifests itself as a scene for display on a display device (not shown). A sequence of S-MEM objects comprises an event list 32. Thus, upon completion of the pre-production, the event list 32 comprises a sequence of S-MEM objects 30 that together represent all the segments of the show.

Following such pre-production, the production phase can commence. In this phase, the Presentation System 36 control the production equipment such as that shown including audio mixer 38, video switcher 40, and one or more cameras, possibly with robotic lenses and dollies 42, by triggering the events upon execution of the S-MEMs in accordance with the rundown. Upon recall of each S-MEM 30 from the event list 32, the Presentation System 36 issues commands to various pieces of production equipment that cause each piece of equipment to enter the particular state recorded in the S-MEM.

As each segment ends, Director 18 issues a "Next" command 34, and the Presentation System 36 will issue commands so that the appropriate pieces of production equipment enters the particular state defined by the next S-MEM. Each S-MEM 30 typically has a finite duration so that Director 18 can see the expected run time of the show. Durations can be of two types. An Absolute duration has a precise length and finds application for pre-recorded source material (video, audio, etc.) having a fixed run-time. In this case, completion of an S-MEM can serve to trigger automatically the next event without the need for a manual "Next" command 34.

However, segment that involves live talent, use of an approximate duration is preferred. The approximate duration aids in predicting the run time of the show, but the progression to the subsequent event will always requires manual initiation to accommodate the timing variations that are inherent in the use of live talent.

Figure 3A:
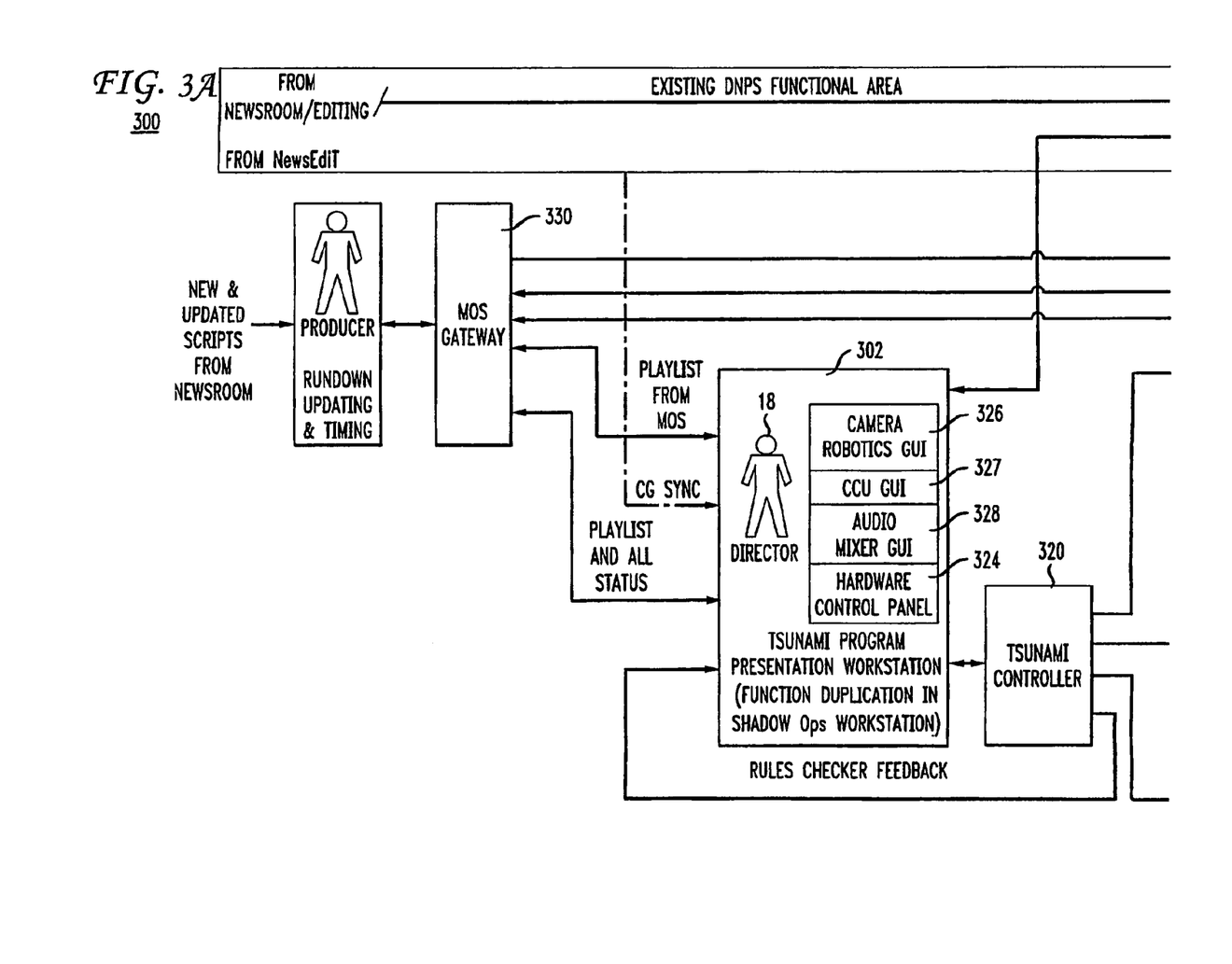
FIG. 3 depicts a block schematic diagram of a television production system embodying the present principles.
Figure 3B:
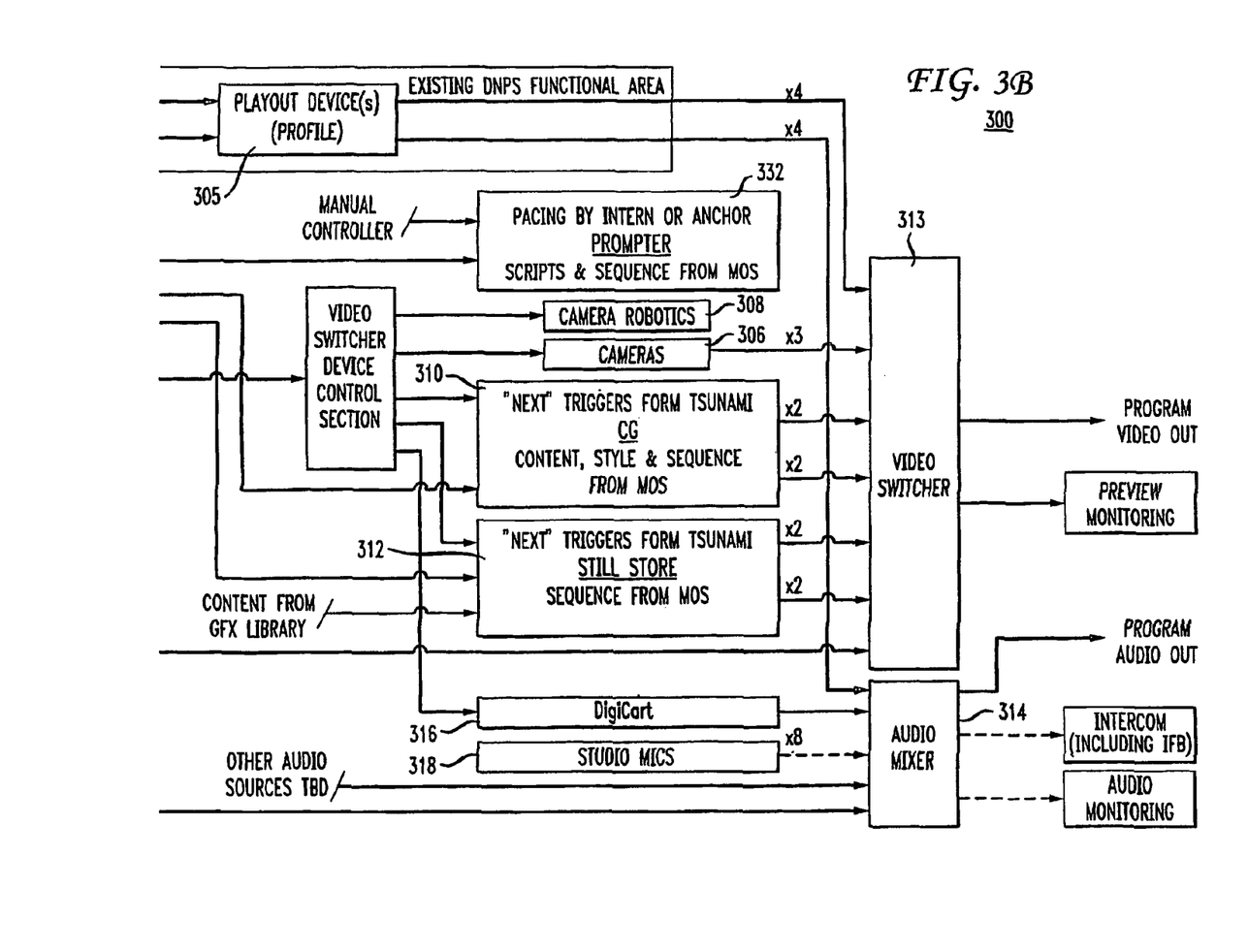

FIG. 3 depicts a block schematic diagram of a television production system 300 embodying the present principles for enabling automated production of a television program, such as a television news program. At the heart of the system 300 lies a context-sensitive control panel 302 described in greater detail in FIG. 4, for allowing the director 18 individually to control multiple production devices by the use of S-MEM as discussed above. Such production devices can include one or more video playout devices, such as a server 305 comprising part of an existing Digital News Production System 306. Other devices controlled via the control panel 302 can include one or more television cameras 306, associated camera robotics 308, a character generator 310, and a still store 312 for storing still video images.

Video signals from the cameras 306, the character generator 310, and the still store 312 pass to a video switcher 313 that selectively switches among input signals under the control of the control panel 302. In the illustrated embodiment, the switcher 313 can to perform various digital video effects, obviating the need for a standalone DVE device. However, the system 300 could include one or more separate DVEs (not shown). The switcher 313 provides both a video program output for transmission and/or recording, as well as a preview output for receipt by a preview monitor (not shown). While not illustrated, the video switcher 313 can also receive video from one or more devices, such as videotape recorders, video cartridge machines, and/or satellite receivers, to name but a few.

The control panel 302 also controls an audio mixer 314 that receives audio input signals from a digital cart machine 316 as well as one or more studio microphones 318. Further, the audio mixer 314 can receive input signals from one or more devices, such as the playback server 304, as well as one or more audio tape recorders (not shown) and/or one or more satellite receivers (not shown). The audio mixer 314 provides a program audio output, as well as an intercom output and an output for audio monitoring, by way of a monitor speaker or the like (not shown).

A controller 320 serves to interface the control panel 302 to the video switcher 313, the audio mixer 314, and to a video switcher device selector 322. The video selector 322 enables the control panel 320 to select one or more of the cameras 306, the camera robotics 308, the character generator 310, and the still store 312 for control. The controller 320 can take the form of a personal computer or the like suitably equipped with appropriate input/output drivers for interfacing with the various elements controllable by the control panel 302. Associated with the control panel 302 are one or more hardware control devices 324 that allow the director 18 of FIG. 2 to enter one or more commands for receipt by the controller 320 for ultimate transmission to the appropriate device for control. The control panel 302 also includes graphical user interfaces 326, 327 and 328, for the camera robotics 308, the cameras 306, and the audio mixer 314, respectively. Such graphical user interfaces can include visual displays provided by The television production system 300 of FIG. 3 can also include a Media Object Server (MOS) gateway coupled to a teleprompter 332 as well as to the character generator 310 and still store 312. The MOS gateway 330 provides an interface to the Digital News Production System (not shown) to allow receipt of updates made by the producer 14, to be received by such devices.

Figure 4:
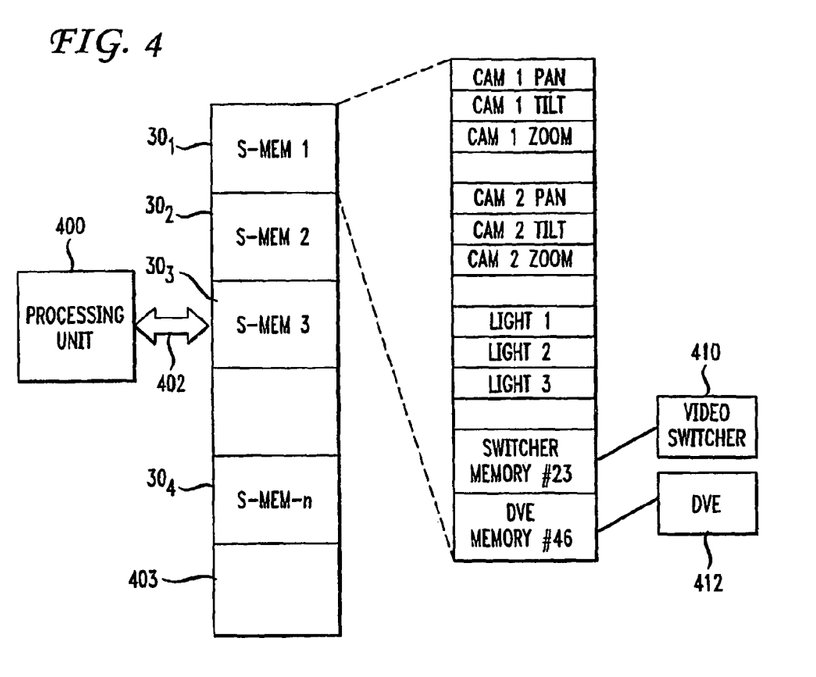
FIG. 4 depicts a simplified block schematic diagram of a presentation system in the work portion of FIG. 2 showing State Memory Objects (S-MEMs) which when executed; trigger the execution of one or more television production devices in the television production system

FIG. 4 shows a simplified block schematic diagram of the Presentation System 36 of FIG. 1 showing the manner in which the presentation system establishes and parameterizes S-MEMs. The presentation system 36 includes a processing unit 100, in the form of a computer or the like. The processing unit 100 enjoys a link through a bi-directional bus to a memory 403 that stores a sequence of S-MEMs $30_1$, $30_2$, $30_3$ ... $30_n$, whereat is an integer greater than zero, the sequence of S-MEMs representing a sequence of segments (scenes) of a television production.

As discussed above, each of the S-MEMs, such as S-MEM $30_1$ comprises a set of operations executable by one or production devices, to create a particular segment. In the illustrated embodiment, the S-MEM $30_1$, includes a pan, tilt, and zoom operation associated with a first camera (CAM 1), as well as a pan, tilt, and zoom operation associated with a second camera (CAM 2) and the lighting of a first, second and third lights (LIGHT 1, LIGHT 2 and LIGHT 3, respectively). In addition, the S-MEM $30_1$ also includes two additional operations associated with placing a respective one of video switcher 410 and Digital Video Effect device 412, respectively, in a particular state, in accordance with the contents of a memory location 23 within the switcher, and a memory location 46 in the DVE, respectively. In practice, both the switcher 410 and DVE 412 have memories whose location can store a particular device state, such as switch, fade, or wipe between two video sources in the case of the switcher, or a particular video effect in the case of the DVE. Upon execution of an S-MEM, such as S-MEM $30_1$, which contains a reference to a particular production device memory location, the production device will enter the state specified by the contents of that location.

Various television production devices can execute a variety of operations. Similarly, the video switcher 410 and DVE 412 can each have a variety of different steps. Thus, for the television production system, such as the television production system 300, there can exist almost an infinite number of S-MEMs. To facilitate S-MEM selection, the S-MEMs are parameterized in accordance in terms of the scene (i.e., the image that results from execution of the S-MEM, that is what appears within an image), rather that in terms of commands (i.e., what each device must do to achieve such an image.)

Parameterizing the S-MEMs in this fashion greatly reduces the effort needed to pre-produce a television show. Of course, the processor 100 can establish and thereafter record each S-MEM by creating the required state of one or more associated production devices. To achieve a greater consistency of a particular television show, the director can define a number of "style" S-MEMs, thus parameterizing the S-MEMs. The director seeking to pre-program a scene can select, for example, a previously defined "style" S-MEM that represents, say, a standard "two shot." This style S-MEM would act as a template, establishing most of the required parameters for a standardized scene consistent with the established "look" of the show. The director would then apply only such control changes as may be necessary to establish the exact parameters for the precise scene envisioned for the show being pre-produced. Parameterizing the S-MEMs by the scenes they produce greater facilitates S-MEM selection.

In practice, definition of styles (i.e., parameterization of the S-MEMs) occurs in advance of the production. In this sense, each style constitutes the equivalent of a vocabulary element of a show. Just as a writer chooses various vocabulary elements to create a writing, the director selects various S-MEMs having a particular style, or even different styles if desired, to create a show. If the director seeks a particular appearance, the director will choose from among the S-MEMs associated with that style. Thus, parameterizing the S-MEMs by style greatly reduces the selection effort. In practice, the processor 100, or another element can manufacture the styles themselves, placing the S-MEMs associated with each style in an associated style library.

The producer 14 need not know very much about the particular operations associated with a particular S-MEM. Typically, a particular show will have a limited number of associated styles. For example, a news show will have a style associate with an individual anchorperson. When the producer selects that style, the producer can then select among those S-MEMs associated with that style, greatly reducing the effort needed to produce the show.

Figure 5:
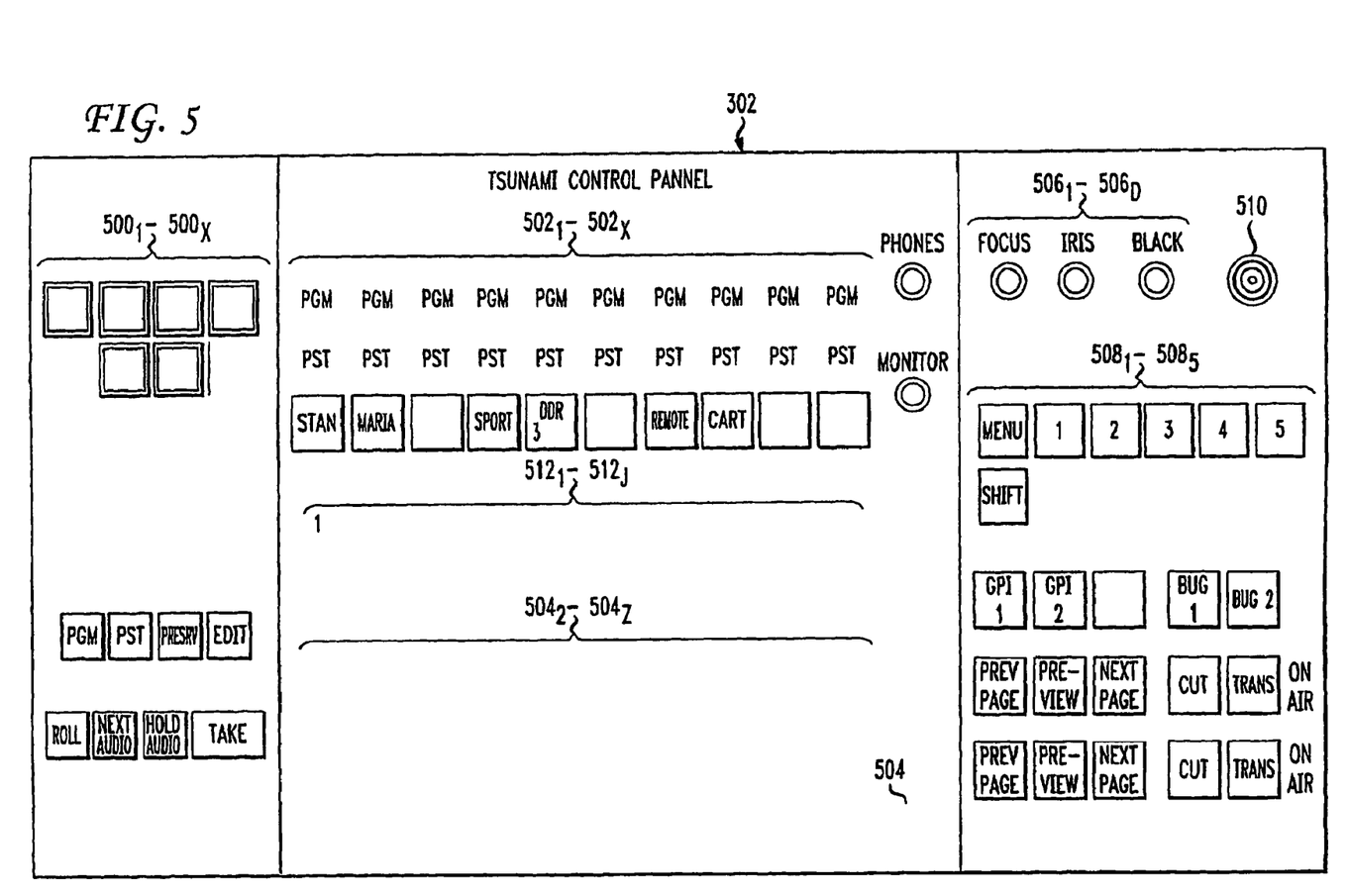
FIG. 5 depicts a plan view of a context sensitive control panel in accordance with another aspect of the present principles.

FIG. 5 depicts a plan view of an exemplary physical layout of the control panel 302 of FIG. 4. The control panel 302 includes a plurality of lamps $500_1$-$500_x$ where x constitutes an integer greater than zero. At least some of the lamps $500_1$-$500_x$ represent a particular condition in the context of a particular S-MEM. Thus, for example, in connection with the S-MEM $30_1$ of FIG. 5, three of the lamps $500_1$-$500_x$ would represent the actuation of LIGHT 1, LIGHT 2, LIGHT 3, respectively. Others of the lamps can represent other operations associated with the S-MEM $30_1$, such as the particular state of the switch 410 and the DVE 412.

Some of the lamps $500_1$-$500_x$ can represent the state of one or more dedicated devices, such as one of more television cameras, or dedicated functions, i.e., "take", "program (PGM)", and "edit" to name but a few such functions. Thus, such lamps will always represent the state of such device or a particular function regardless of the S-MEM.

In addition to the lamps $500_1$-$500_x$, the control panel 302 includes a first set of actuators $502_1$-$502_y$, (where y is an integer greater than zero), a second set of actuators $504_1$-$504_z$, where z is an integer greater than zero, a third set of actuators $506_1$-$506_p$, a fourth set of actuators $508_1$-$508_c$ (where c is an integer greater than zero) as well as at least one joy stick 510. In the illustrated embodiment, each of the set of actuators $502_1$-$502_z$ comprises a push-button switch, which can execute a dedicated operation, i.e., a "take" or a specific operation in the context of the execution of a particular S-MEM.

In the illustrated embodiment, each of the second set of actuators $504_1$-$504_z$, comprises a servo-controlled fader. As with each of the push buttons $502_1$-$502_z$, each of the actuators can execute a dedicated operation, for example, a master fade or wipe in the case of fader $504_1$ or an operation dependent on the context of a specific S-MEM. Thus, for example, a particular one of the faders $504_2$-$504_z$ could execute an audio fade in the context of a particular S-MEM, whereas in the context of another S-MEM, that same fader could execute a video wipe.

The actuators $506_1$-$506_p$ comprise rotary devices, such as potentiometers or rotatable shaft encoders. One or more of these actuators can have a dedicated function irrespective of the execution of a current S-MEM. Others of the actuators $506_1$-$506_p$ can control a function associated with one or more devices in the context of a particular S-MEM, whereas, in the context of a different S-MEM, the actuators will control a different function associated with the same or different devices.

Like each of actuators $502_1$-$502_z$, each of actuators $508_1$-$508_c$ typically comprises a push button. As compared to the push buttons $502_1$-$502_z$, the majority of which are context dependent, the majority of the push buttons $508_1$-$508_c$ have dedicated roles, e.g., accomplishing "preview", "next page", "cut", and "transmit" operations to name but a few.

The Actuator 510 comprises a joystick, the function of which is typically context dependent. Thus, depending on the execution of a particular S-MEM, the joystick 510 could serve to pan and tilt a first television camera, whereas in the context of another S-MEM, the joystick could operate a video replay device.

Lastly, the control panel 302 can include a plurality of audio level monitors $512_1$-$512_j$ where j is an integer greater than zero. Each of the audio level monitors provides an indication, typically by means of a bar indicator, of the level of a particular audio device, such as a microphone, for example, in the context of a particular S-MEM. Thus for example, in connection with a particular S-MEM, a given one of the audio level monitors will indicate the audio level of a particular microphone, while in connection with a different S-MEM, the same audio indicator will indicate the level of a different microphone.

In practice, each of audio level monitors $512_1$-$512_j$ lies aligned with a corresponding one of the faders $504_2$-$504_z$. To the extent that a particular one of the faders $504_2$-$504_z$ controls a particular audio device, such as a microphone, in connection with a particular S-MEM, the audio level monitor aligned with that fader will indicate the level of that controlled device.

Figure 6:
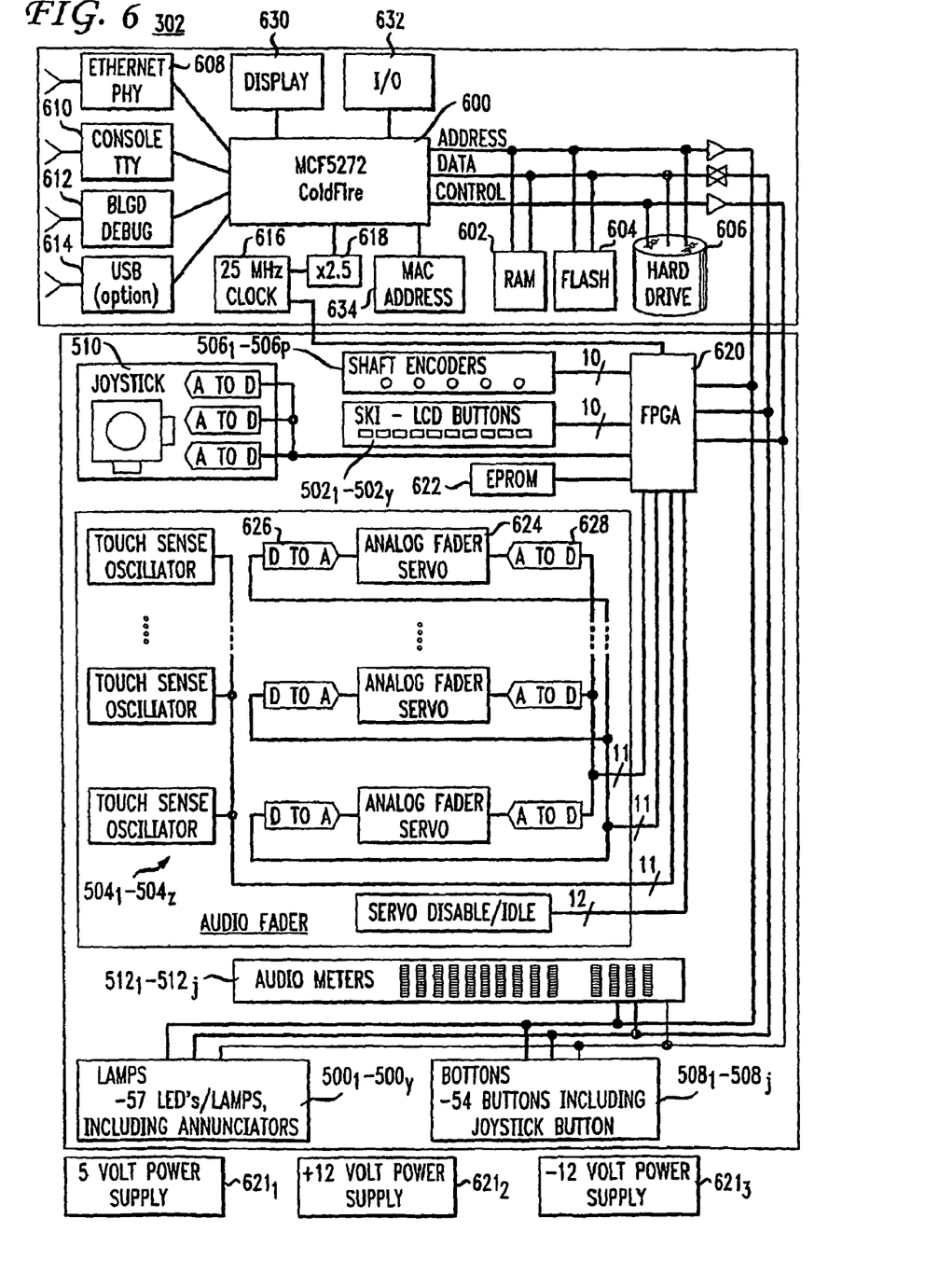
FIG. 6 depicts a block schematic diagram of elements comprising the context sensitive control panel of FIG. 5.

FIG. 6 depicts an electrical block diagram of the control panel 302 of FIG. 4. A single board microcomputer 600 serves as the controller for the control panel 302. The microcomputer 600 has address, data, and control busses, through which the microcomputer connects to a Random Access Memory 602, a Flash Memory 604, and a mass storage device 606, typically in the form of a magnetic hard disk drive. In practice, the hard disk drive 606 will contain program instructions, whereas the flash memory 604 can contain a basic input/output operating system (BIOS). The microcomputer 600 has interfaces 608 and 610 for interfacing to an Ethernet network (not shown) and a console teletype, respectively. A background debugger 612, typically comprising a memory block or the like, contains a debugging program suitable for debugging errors.

An optional USB port 614 enables the computer 600 to interface to device via a USB connection. A clock 616, typically having a 25 MHz. frequency, provides clock pulses to a multiplier 618 that provides clock signals to the microcomputer 600 at 2.5 times the frequency of the clock 616. A Media Access Control (MAC) storage block 620 provides storage for MAC addresses used by the microcomputer 600. Each of power supplies 621$_1$, 621$_2$, and 621$_3$ provides microcomputer 600, as well as other elements associated with the control panel 302, with 5 volts, +12 and −12 volts, DC, respectively.

The microcomputer 600 has at least one display 622 for displaying information. In practice, the microcomputer could have several displays, including one or more touch screens (not shown), one or more Liquid Crystal Displays (LCDs) as well at least one video monitor. One or more input/output devices 624, such as a keyboard and/or computer mouse, are connected to the microcomputer 600 to allow an operator to enter programming information and/or data.

A Field Programmable Gate Array (FPGA) 620 serves to interface the microcomputer 600 to faders 504$_1$-504$_z$. In practice, each of faders 504$_1$-504$_z$ comprises an analog fader servo 624 supplied from the FPGA 620 with an analog signal via a digital-to-analog converter 626. A analog-to-digital converter 628 converts the analog signal produced by the analog fader servo 624 back to a digital signal for input to the FPGA 620. The FPGA 620 also interfaces the shaft encoders 506$_1$-506$_p$, the buttons 502$_1$-502$_x$ and the joystick 510 to the microcomputer 600. An Electrically Programmable Reads-Only Memory 622 stores program instructions for the FPGA 622 to facilitate its operation.

In operation, the microcomputer 600 will serve to activate the appropriate ones of the lamps of the 500$_1$-500$_x$, taking into account the which S-MEM is currently active. The microcomputer 600 will also activate one or more of the push buttons 502$_1$-502$_y$, one or more of the faders 504$_1$-504$_z$, one or more of the shaft encoders 506$_1$-506$_p$, one or more of the push buttons 508$_1$-508$_c$, as well as the joystick 510 depending on the active S-MEM. Similarly, the microcomputer 600 will assign the audio indicating devices 512$_1$-512$_j$ depending on the active S-MEM.

The control panel 302 as described above advantageously allows an operator to control different aspects of various production devices for individual show segments. In the past, a single technical operator could not easily control all of the devices by virtue of the inability to physically reach all of the separate control panels of all the devices. The context sensitive control panel 302 provides a set of control elements one or more of which can control different functions of different production devices at different times, depending on the context of a particular scene. In this way, physical size of the control panel can be reduced, yet still afford an operator the control function necessary.

The foregoing describes a television production technique, which affords greater simplification in preprogramming a television show.

The invention claimed is:

1. A method of controlling at least two production devices for producing a show, comprising the steps of:
    establishing a plurality of states of the at least two production devices, each established state corresponding to a different operation that is performed by at least one of the two devices;
    storing the states as corresponding memory objects which objects are to be sequentially executed during a production sequence;
    executing one of the stored memory objects causing the at least two production devices to perform the corresponding operations, which results in the generation of a scene;
    responsive to the execution of the memory object, associating the memory object with at least two physically displaceable actuators on a physical control panel wherein, displacing a respective one of the displaceable actuators, causes the operation of a respective one of the at least two production devices to be modified.

2. The method according to claim 1 wherein one of the at least two production devices comprises a linear fader.

3. The method according to claim 1 wherein one of the at least two production devices comprises a switch.

4. The method according to claim 1 wherein one of the at least two displaceable actuators comprises a multi-axis actuator.

5. The method according to claim 1 wherein one of the at least two displaceable actuators comprises a plurality of actuators.

6. The method according to claim 5 wherein the step of displacing further comprises displacing ones of the plurality of actuators each associated with a separate production device.

7. An apparatus for controlling at least two production devices for producing a television show, comprising:
    a processor for establishing a plurality of states of the at least two production devices, each established state corresponding to a different operation that is performed by at least one of the two devices;
    a memory for storing the states as corresponding memory objects which objects are to be sequentially executed during a production sequence;
    the processor for executing one of the stored memory objects causing the at least two production device to perform the corresponding operations, which results in the generation of a scene;
    responsive to the execution of the memory object, the processor associating the memory object with at least two physically displaceable actuators on a physical control panel wherein, displacing a respective one of the displaceable actuators, causes the operation of a respective one of the at least two production device to be modified.

8. The apparatus according to claim 7 wherein one of the at least two production devices comprises a linear fader.

9. The apparatus according to claim 7 wherein one of the at least two production devices comprises a switch.

10. The apparatus according to claim 7 wherein one of the actuators comprises a multi-axis actuator.

* * * * *